June 24, 1930.  L. M. PERKINS  1,766,799
ELECTRIC MOTOR
Filed Nov. 20, 1926   3 Sheets-Sheet 2

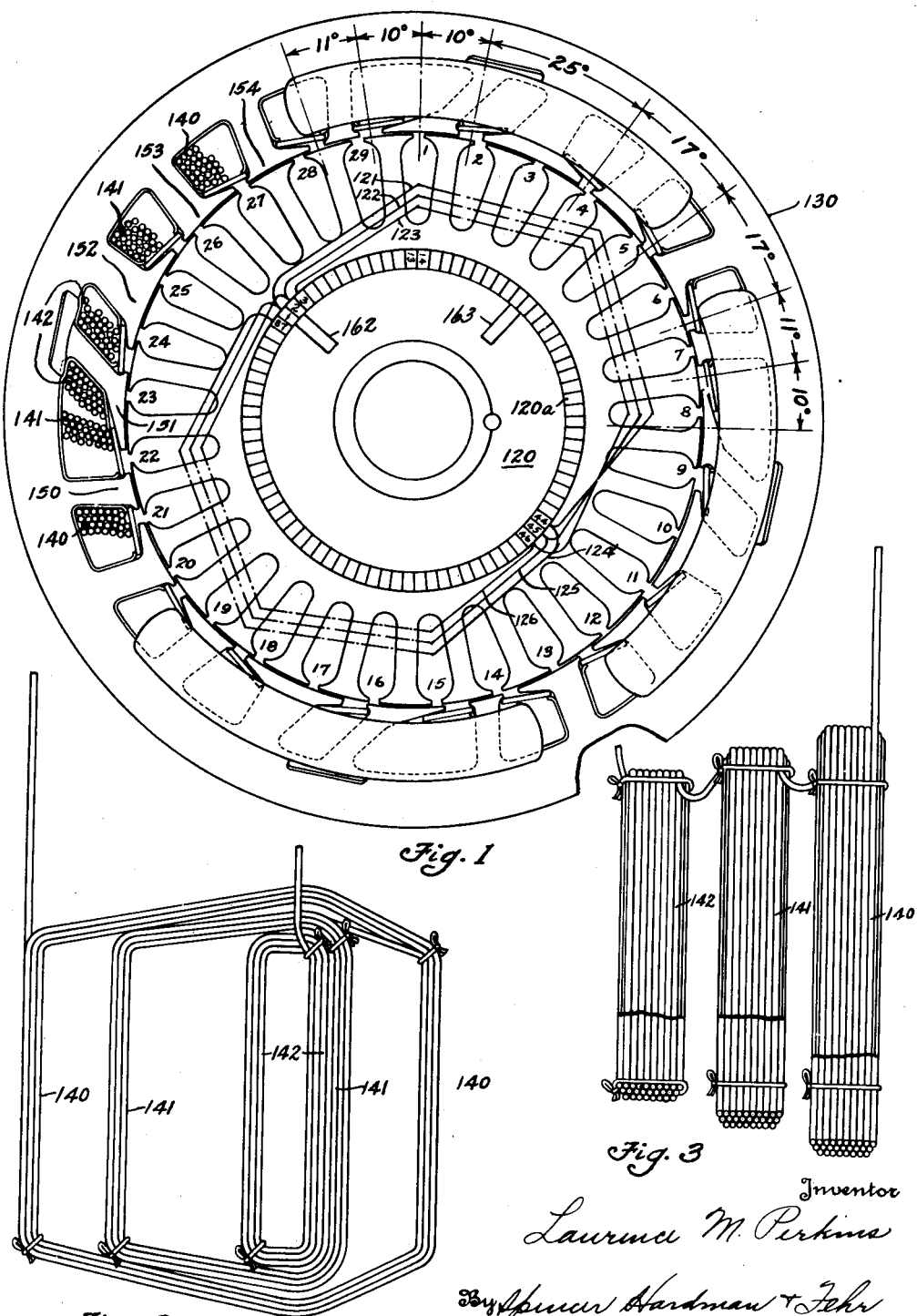

Inventor
Laurence M. Perkins
By Spencer Hardman & Fehr
his Attorneys

June 24, 1930.  L. M. PERKINS  1,766,799
ELECTRIC MOTOR
Filed Nov. 20, 1926   3 Sheets-Sheet 3

Inventor
Laurence M. Perkins
By Spencer Hardman & Fehr
his Attorneys

Patented June 24, 1930

1,766,799

UNITED STATES PATENT OFFICE

LAURENCE M. PERKINS, OF ANDERSON, INDIANA, ASSIGNOR, BY MESNE ASSIGNMENTS, TO DELCO-REMY CORPORATION, OF DAYTON, OHIO, A CORPORATION OF DELAWARE

ELECTRIC MOTOR

Application filed November 20, 1926. Serial No. 149,755.

This invention relates to electric motors of the series type which are adapted to be operated either on direct or alternating current, such motors being commonly known as universal motors.

One object of the present invention, is to provide a series type universal motor having high power factor, good efficiency, good commutation and also one which is simple in construction and may be produced at relatively low cost. The invention resides more particularly in the construction and arrangement of the stator windings, and a particular aim is to provide with the fewest turns of wire with the fewest connections between the stator coils and by the most compact arrangement the windings which provide for field excitation, for compensation for armature reaction and for counteracting the voltage induced in the short circuited armature coil in order to secure good commutation. In the present invention this is carried out by an arrangement of exciting, compensating and interpole windings permitting each group of these windings to be connected in series and hence to be formed from a continuous length of wire, these windings being preformed and adapted to be mounted as a group upon the stator core.

A further object of the invention is to provide improved means which cooperates with the interpole windings in a manner such that the voltage applied to the interpole windings will be out of phase with the voltage applied to the main poles in amount and direction such that the voltage generated in the short-circuited armature coil (coil connected with commutator bars under a brush) by the field of the interpole will counteract the voltage generated in said coil by the main field and will also assist in reversing the current in the short circuited coil. In the present invention this means is provided by short-circuited coils each inductively related to an interpole winding, preferably by single turn closed loops each surrounding an interpole tooth.

Further objects and advantages of the present invention will be apparent from the following description, reference being had to the accompanying drawings, wherein a preferred form of embodiment of the present invention is clearly shown.

In the drawings:

Fig. 1 is an end view, partly diagrammatic, of a motor constructed in accordance with the present invention;

Fig. 2 is a plan view of a stator coil structure including the exciting, compensating and interpole windings;

Fig. 3 is a side view, partly in section, of the windings shown in Fig. 2;

The rotor

Figure 4:
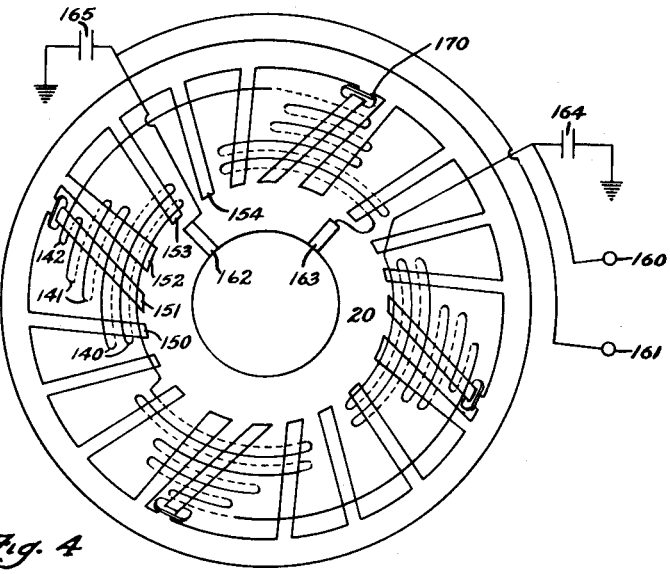
Fig. 4 is a diagram showing the stator connections of the motor.

The present invention can best be described by its application to a specific motor adapted to be operated on 110 volts 60 cycle, alternating current at 1½ times synchronous speed, which has been chosen as an example of one embodiment of the invention.

According to the usual formula:— volts × power factor =
$$\frac{\varphi \times \text{number of wires} \times \text{R.P.M.} \times 2}{6 \times 10^8}$$

the armature should have 870 active coil sides or 435 turns which may be provided by 87 coils having 5 turns each.

The number of armature core slots is determined by the number of segments in the commutator. Each segment should be large enough to allow for slotting for receiving the armature leads and there should be a sufficient number of bars so that the voltage per bar will be what the brush may safely withstand. The number of bars in a motor without an interpole and operating at synchronous speed can be calculated with reference to the formula:—

$$\text{volts per bar} = \frac{\text{line voltage}}{\text{bars per pole}}$$

Assuming 87 bars and 4 poles, the volts per bar will be 5 volts. Since the motor operates at 1½ times synchronous speed, the volts per bar will be 3⅓ volts under the brush. Therefore, the commutator 120 of Figs. 1 and 4 may have 87 bars 120$^a$. By using the interpole windings to be described, the number of bars may be reduced to 57, or a motor having 87 commutator bars may be operated on 220 volts.

The number of armature core slots should be the number of commutator bars divided by an integer. It is desirable to provide as many armature core slots as possible to reduce the total armature reactance, but this consideration is offset by additional cost. Hence the chosen number of slots in the present rotor is 29. Since there are 870 active coil sides there will be 30 wires in each slot. Each slot will contain the active coil sides of six coils having 5 turns each. Fig. 1 shows diagrammatically the connections of coils 121 to 126 with the commutator and their location upon the core. Coils 121, 122 and 123 thread slots #1 and #8 and are connected respectively with bars #1, #2 and #3 and bars #44, #45 and #46. Coils 124, 125 and 126 thread slots #15 and #22 and are connected respectively with bars #44, #45 and #46 and bars #87, #1 and #2. The numbering of slots and bars is purely arbitrary but is done to show the location of the armature coils. Slot #1 is adjacent bars #13 and #14. The connections and location of the remaining coils will therefore be apparent.

*The stator*

Theoretically, if the armature has $x$ wires per degree of circumference, the compensating field should have $\frac{x}{2}$ wires per degree since two wires of the armature are in parallel. Practically there should be slightly more turns in the field in order to reduce the number of turns required for the interpole, because of the lack of interpole winding space.

Figure 5:
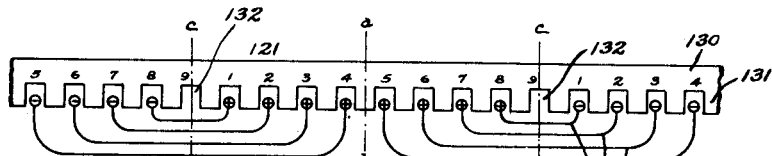
Fig. 5 is a diagram of the theoretical compensating windings of the stator.

Referring to Fig. 5, 130 designates a fragment of a theoretical stator core having teeth 131 spaced 10 degrees apart. Line $a$—$b$ represents the axis of an exciting field pole, and $c$—$d$, the axes of compensating field poles. If in each slot of the armature, or in each $\frac{360°}{29}$ or 12.4° of the armature periphery there are 30 wires, there should be 15 wires in each 12.4° of the stator, or 12.1 wires in each 10° or in each slot of the stator. Therefore, each small circle marked plus or minus in Fig. 5 represents 12.1 wires. The slots 132 in alignment with the axis $c$—$d$ are left empty to provide space for interpole windings. Therefore, each polar group of compensating windings includes theoretically 4 coils 133 of 12.1 turns each distributed as shown in Fig. 5.

Figure 6:
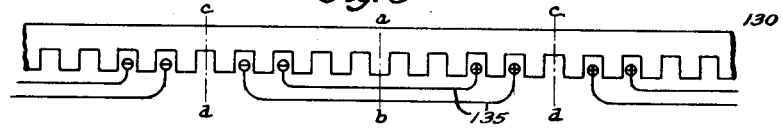
Fig. 6 is a diagram of the theoretical exciting windings of the stator.
Figure 7:
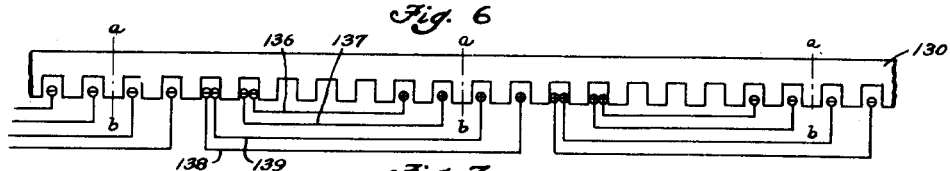
Fig. 7 is a diagram of the theoretical combined compensating and exciting windings of the stator.
Figure 8:
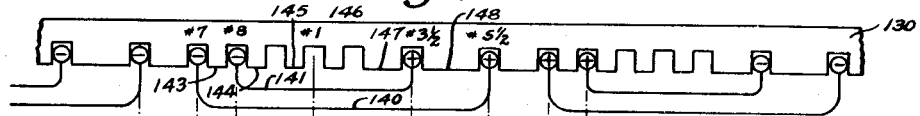
Fig. 8 is a diagram of a practical grouping of the compensating and exciting windings in order to reduce the number of stator coils.

Theoretically the exciting field windings include 2 coils 135 per pole of 12.1 turns each, distributed in slots 1, 2, 7 and 8 as shown in Fig. 6. The resultant or combination of the windings shown in Figs. 5 and 6 is shown in Fig. 7. The compensating wires in slots 1 and 2 are opposite in electrical sign to the exciting wires in these slots and hence neutralize one another. The resultant windings are coils 136 and 137 having active coil sides in slot 8 and distributed in slots 3 and 4 of an adjacent group of stator slots, and coils 138 and 139 having active coil sides in slot 7 and distributed in slots 5 and 6 of an adjacent group. In order to simplify manufacture it is desirable to combine coils 136 and 137 into a coil 141 and coils 138 and 139 into a coil 140, these coils having 24.2 turns each. Coil 141 threads slot 8 and slot 3½ in Fig. 8, which is midway between slots 3 and 4 in Fig. 7. Coil 140 threads slot 7 and slot 5½ in Fig. 8 which is midway between slots 5 and 6 in Fig. 7.

Figure 9:
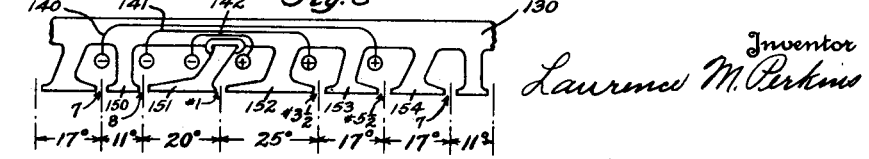
Fig. 9 is a diagram of a group of the stator windings, including the interpole winding and inductively related short-circuited coil as used in the motor shown in Fig. 1.

Fig. 9 shows a further compromise which has been made to secure the maximum winding space within a relatively small periphery. Slot 7 is 11° from slot 8 in Fig. 9 instead of 10° as in Fig. 8. Slot 5½ is 17° from slot 7 instead of 15°, and slot 3½ is 17° from slot 5½ instead of 15° as in Fig. 8. Tooth 143 of Fig. 7 becomes tooth 150 of Fig. 8; teeth 144 and 145 become tooth 151; teeth 146 and 147 become tooth 152; and tooth 148 becomes tooth 153. The center of tooth 151 is intersected by the interpole axis, hence an interpole coil 142 surrounds the shank of each tooth 151. Coil 141 encloses teeth 151 and 152, and coil 140 encloses teeth 150, 151, 152, and 153. Tooth 154 is not enclosed by any coil. The interpole tooth should span 1½ armature teeth 1½ times $\frac{360°}{29} = 18.2°$. It will be noted that the interpole tooth 151 is slightly less than 20° in width.

The coils 140 and 141, which together provide for field excitations and armature reaction compensation are connected in series with the interpole coil 142 which functions in a manner to be described. Hence the coils 140, 141 and 142 may be preformed from a single length of wire as shown in Fig. 3 and inserted into the proper slots as shown in Fig. 1, which is in accord with the diagram shown in Fig. 9.

Referring to the diagram in Fig. 4, there are four groups of pole teeth 150 to 154, and four groups of stator coils 140 and 142 which are connected in series with terminals 160 and 161 and with brushes 162 and 163 which are located so as to short circuit the armature coils having wires opposite the interpole teeth 151 as shown in Fig. 1. Condensers 164 and 165, connected as shown in Fig. 4, may be used to minimize effects such as would be disturbing to radio receiving apparatus located nearby.

Interpole shading coils

Each stator interpole 151 is surrounded by a single turn closed loop or shading coil 170 which cooperates with an interpole coil 142, when the motor is operated by alternating current, in a manner such as to cause the voltage applied to the interpole windings to be out of phase with the voltage applied to the main poles in amount and direction such that the voltage generated in the short-circuit armature coil by the interpole field will counteract the voltage generated in said short-circuited coil by the main field, and will also assist in reversing the current in the short-circuited coil. The reason for using a closed coil inductively related to the interpole coil will be more apparent from the following description of the diagrams shown in Figs. 10 to 14.

Figure 10:
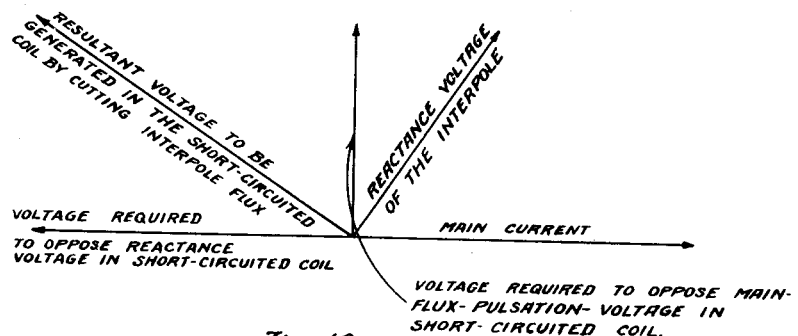
Figs. 10 to 13 are vector and construction diagrams which can best be described along with the descriptive matter which follows.
Figure 11:
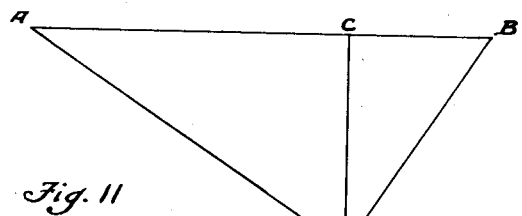

As represented in Fig. 10, the voltage required to be generated in the short-circuited armature coil by cutting interpole flux is the resultant of components 90° and 180° out of phase with the main current, the first being voltage required to oppose voltage in the short-circuited coil due to pulsations of main-field flux, and the second being voltage required to oppose the reactance voltage in said coil. In Fig. 11, line AB represents in direction the total current or total turns in the interpole, (the amount to be determined graphically), this current being in phase with the main current. Since the voltage to be generated in the short-circuited coil is in phase with the flux producing it, flux-producing or effective current of the interpole is in phase with the voltage to be generated and hence is represented by the line AD. By placing the proper resistance in shunt with the interpole, current AB may be resolved into the required flux producing current AD and resistance diverted current DB, the latter being in phase with the voltage impressed upon the interpole or impedance voltage. It is apparent that AB will be the minimum when DB is at right angles to AD or when the impedance voltage is 90 degrees out of phase with the flux producing interpole current AD as shown in Fig. 10. Neglecting iron losses, this condition would be present if the resistance of the interpole could be considered zero the main current would be impressed on a pure resistance in shunt with a pure reactance. If the current diverting resistance be inductively related to the interpole, the effect will be the same as if the interpole had no resistance because the resistance voltage component of the total impedance voltage, cannot be transformed or united by induction with the voltage impressed upon the resistance element. Therefore, each interpolar tooth carries a single turn closed loop or shading coil 170 which operates as a resistance in shunt with a pure reactance to split the main current into components, one of which produces interpole flux in the correct amount and phase relation referred to, and the other of which is useless and is known as the resistance diverted current component.

Figure 12:
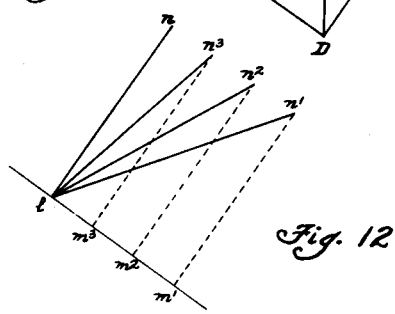
Figure 13:
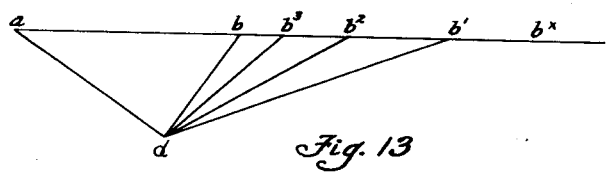

In order to show more clearly why the total current or ampere-turns required of the interpole is the minimum when the resistance of the interpole coil is zero, reference is made to Figs. 12 and 13. Suppose that the interpole coil has a resistance voltage represented by $lm'$ in Fig. 12, and a reactance voltage represented by $m'n'$ at right angles to $lm'$ the impedance voltage will be represented by $ln'$. Since $lm'$ has been drawn parallel to the line in Fig. 10 representing total voltage to be generated by interpole flux, or parallel to line AD in Fig. 11 representing flux-producing-interpole current, the line $ln'$ will represent the phase relation between impedance voltage and main current. In Fig. 13, line $ab^x$ represents vectorially the main current, the length yet to be determined. Line $ad$ is parallel to AD in Fig. 11 and represents flux-producing current, and line $db'$ drawn from $d$ parallel to $ln'$ represents resistance diverted current. Distance $ab'$ is total current or ampere-turns required of the interpole coil. As the resistance of the interpole diminishes, as represented by lines $lm^2$ $lm^3$, the inclination to horizontal of the impedance vectors increases as represented by lines $ln^2$, $ln^3$. Therefore, the distances on line $ab^x$ representing total ampere turns diminish, as represented by lines $ab^2$, $ab^3$. When $lm$ is zero, the impedance voltage coincides with the reactance voltage, hence $ln$ is at right angles to the vector representing flux producing interpole current. Line $db$ will represent the minimum resistance diverted current, and line $ab$ will represent the minimum ampere turns required of the interpole coils.

Calculation of interpole coils

Before showing how the use of shading coils helps to reduce the number of interpole turns of the particular motor which has been specified as illustrating the invention, an explanation of the calculation of the interpole coils will be given.

The number of turns in the interpole winding is calculated from the number of turns in the exciting field and the ratio of the voltage required to be induced in the short-circuited armature coil for opposing reactance voltage therein, to the voltage required to be induced in the short-circuited coil for opposing voltage due to flux-pulsations in the exciting field. In Fig. 11, the line AC may be used to represent the former voltage, CD the latter, and AD the geometrical sum of these voltages.

In small motors wherein the winding space is limited, it is usually necessary to add to the exciting winding a part of the number of turns theoretically required for the interpole winding, as generally there is insufficient winding space for the theoretically calculated interpole winding. In order to estimate the number of turns to be added to the 24.2 turns required for the exciting field coils, the equation $\frac{CD}{AB} = \frac{2}{5}$ will be assumed.

$$CD = \frac{\text{synchronous speed}}{\text{actual speed}} \times \text{turns in exciting winding}$$

$$CD = \frac{2}{3} \times 24.1 = 16$$

$$AB = \text{approximately } 36$$

As the winding space for the interpole coils is limited, a compromise can be made by adding 4 turns to each of the coils 140 and 141 so that each of the coils 140, 141 and 142 will have 28 turns.

Assuming that 28 is the correct number of turns in the exciting field, the number of interpole turns will be recalculated.

$AC$ (reactance voltage) $=$ $$\frac{\text{line voltage}}{\text{commutator bars per pole}} = \frac{110}{\frac{87}{4}} = 5$$

$CD$ (main flux pulsation voltage) $=$ $$AC \frac{\text{synchronous speed}}{\text{actual speed}}$$

$$CD = 5 \times \frac{2}{3} = 3.33$$

Assuming DB is at right angles to AD as in the previous calculation, $$CB = \frac{(3.33)^2}{5} = 2.2$$

$$AB = 5 + 2.2 = 7.2$$

$$\frac{\text{Amperes required for the voltage } CD}{\text{total amperes}} =$$

$$\frac{CD}{AB} = \frac{3.33}{7.20}$$

Amperes required for the voltage $CD = \frac{3.33}{7.20}$ total amperes $Ti =$ turns in interpole coil $$Ti \times \frac{3.33}{7.20} \times \text{total amps.} = \frac{\text{synchronous speed}}{\text{actual speed}} \times \text{turns in exciting field} \times \text{total amps.}$$

$$Ti \times \frac{3.33}{7.20} = \frac{2}{3} \times 28$$

$$Ti = 40.3 +$$

This result is 4 turns greater than the previous approximate calculation, but again a compromise may be made safely by using 36 theoretically interpole turns and allowing part of the voltage, say ¼ to ½ volt, of the short circuited coil to remain uncounteracted. The brush can be relied on to carry ½ volt safely.

The size of the shading coil 170 is determined by the current to be carried by it which is determined from the ratio $\frac{DB}{AB}$, the transformation ratio between coils 142 and 170 and the total current. As hysteresis and eddy current losses help to divert a certain amount of current represented by line DB, the interpole iron can be relied on to carry a part of the current theoretically required to be carried by the shading coil. Thus the size of the cross section of coil may be reduced.

In relatively small motors, the interpole iron can be relied upon solely to provide the shading coil effect, thus eliminating the use of the separate single turn loops 170.

On account of iron losses the angle ADB is slightly greater than 90°, but as a practical matter the previous calculations are not substantially affected, because the brushes can be relied upon to carry the unbalanced voltage of the short-circuited armature coil.

It is apparent that if a resistance in direct shunt with the interpole were used it would be impossible to provide for the necessary interpole winding space in a small motor. If the resistance of the interpole coil were kept low by using large wire in order to reduce the number of interpole turns, the winding space would be inadequate on account of the size of the wire. On the other hand, if the wire is small, the resistance is higher and greater number of turns will be required. This dilemma is avoided by using the shading coils 170 which eliminate consideration of the resistance of the interpole. By referring to Figs. 12 and 13, it is apparent that if the resistance voltage $lm^2$ of the interpole coil were one-half its reactance voltage $m^2 n^2$, the interpole turns $ab^2$ would be about $5/3$ of the turns required when shading coils are used, or about 60 turns in example specified.

Another advantage of the use of the shading coils is low cost of manufacture of these resistances since they may be made of sheet metal punchings.

A still further advantage is that the use of shading coils avoids separating the interpole windings from the other stator windings and making contact connections with the resistance shunts.

While the form of embodiment of the present invention as herein disclosed, constitutes a preferred form, it is to be understood that other forms might be adopted, all coming within the scope of the claims which follow.

What is claimed is as follows:

1. An alternating current motor having an interpole winding and a single turn closed loop resistance winding inductively related to the interpole winding.

2. An alternating current motor having an interpolar projection, an interpole winding surrounding said projection, and a separate single turn closed loop resistance winding surrounding the projection.

3. An alternating current motor having an interpolar projection, an interpole winding, and a sheet metal single turn closed loop surrounding the projection.

4. An alternating current motor having a combined exciting compensating and interpole winding, and a separate short-circuited winding so related inductively to said combined winding as to shift the phase of the interpole flux to improve commutation.

5. An alternating current motor having a combined exciting compensating and interpole winding, an interpolar projection surrounded by said winding, and a separate short-circuited winding surrounding said projection so as to shift the phase of the interpole flux to improve commutation.

6. A single phase alternating current motor with a slotted stator having non-overlapping groups of stator windings, each group having coils connected in series one of said coils threading a slot intermediate slots threaded by the other coils in the group, said coils being so distributed in the stator slots as to produce exciting, compensating and interpole flux.

7. A single phase alternating current motor with a slotted stator having non-overlapping groups of stator windings, said stator being provided with a projection intermediate adjacent pairs of slots, each group having coils formed from a continuous length of wire, each coil in said group enclosing either more or less projections than any other coil in said group, said coils being so distributed in the slots as to produce exciting, compensating and interpole flux.

8. A single phase alternating current motor having a stator provided with a plurality of projections, and having non-overlapping groups of stator windings, each group having coils connected in series, said coils enclosing a common projection and so distributed as to produce exciting, compensating and interpole flux.

9. A single phase alternating current motor with a slotted stator having groups of stator windings, said stator being provided with a projection intermediate adjacent slots, each group having coils connected in series, said coils surrounding an unequal number of projections, one of which is common to all of said coils, said stator windings being so arranged as to produce exciting, compensating, and interpole flux.

In testimony whereof I hereto affix my signature.

LAURENCE M. PERKINS.